United States Patent [19]

Duffy

[11] Patent Number: 5,050,445
[45] Date of Patent: Sep. 24, 1991

[54] STREAMLINED GUIDE WIRE COVER APPARATUS

[76] Inventor: Niall J. Duffy, 41 Fayette St., Watertown, Mass. 02172

[21] Appl. No.: 493,631

[22] Filed: Mar. 15, 1990

[51] Int. Cl.⁵ .............................................. F16C 1/26
[52] U.S. Cl. .................................... 74/502.5; 74/502.3
[58] Field of Search ................. 74/502.6, 502.5, 502.3; 138/128, DIG. 11, 156; 114/243, 111, 102; 116/173, 264, 265; 73/188

[56] References Cited

U.S. PATENT DOCUMENTS

| 2,774,382 | 12/1956 | Bentley | 74/502.5 X |
| 2,990,309 | 6/1961 | Wahl et al. | 138/128 X |
| 3,137,264 | 6/1964 | Brainard, II et al. | 114/243 X |
| 3,712,261 | 1/1973 | McLelland et al. | 114/243 |
| 3,748,215 | 7/1973 | Lenzi | 138/128 X |
| 3,815,412 | 6/1974 | Keim | 116/173 X |
| 4,227,406 | 10/1980 | Coffey | 116/265 X |
| 4,829,929 | 5/1989 | Kerfoot | 114/243 |

FOREIGN PATENT DOCUMENTS

| 384780 | 4/1908 | France | 74/502.5 |
| 1568848 | 12/1967 | France | 114/243 |
| 2428761 | 2/1980 | France | 74/502.5 |
| 57-30684 | 2/1982 | Japan | 114/243 |
| 147160 | 5/1921 | United Kingdom | 114/243 |
| 2091189 | 7/1982 | United Kingdom | 114/243 |

Primary Examiner—Rodney M. Lindsey
Attorney, Agent, or Firm—Leon Gilden

[57] ABSTRACT

A guide wire cover including a parabolic arcuate forward end portion and including an upper and lower arcuate surface extending rearwardly into cooperating rear terminal ends terminating in a coextensive linear edge parallel to and arranged medially of the forward arcuate surface of the apparatus defining a sheath slidably mounted in cooperation with a guide wire and extending coextensively therewith. The sheath may further include a coextensive interior liner formed interiorly of the sheath mounted within a stepped floor of the sheath to define a coextensive interior arcuate surface to provide a surface resistant to premature erosion in cooperation with the associated guide wire.

2 Claims, 4 Drawing Sheets

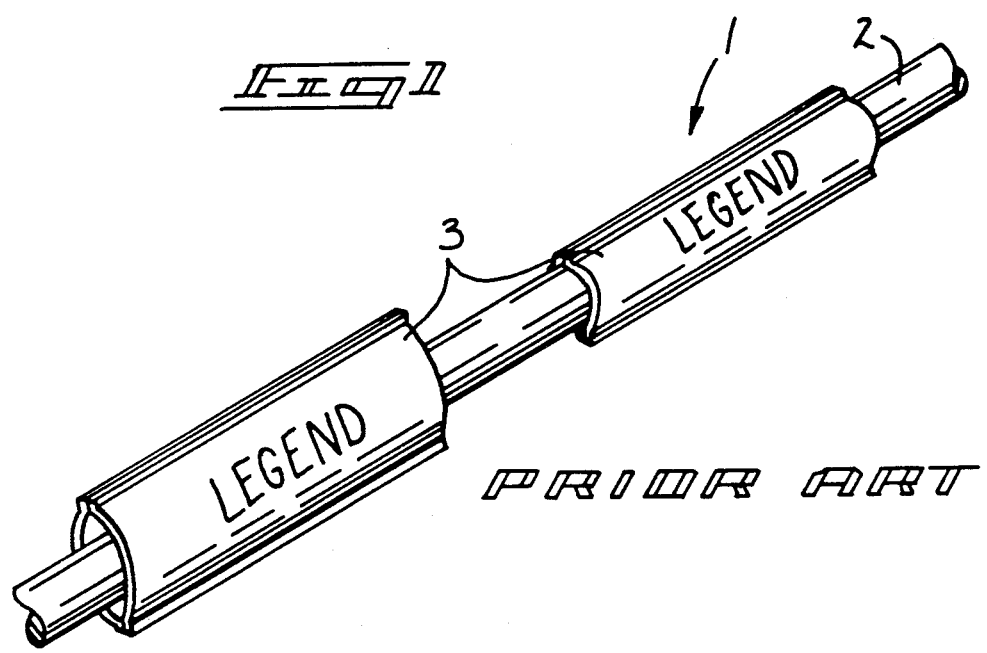
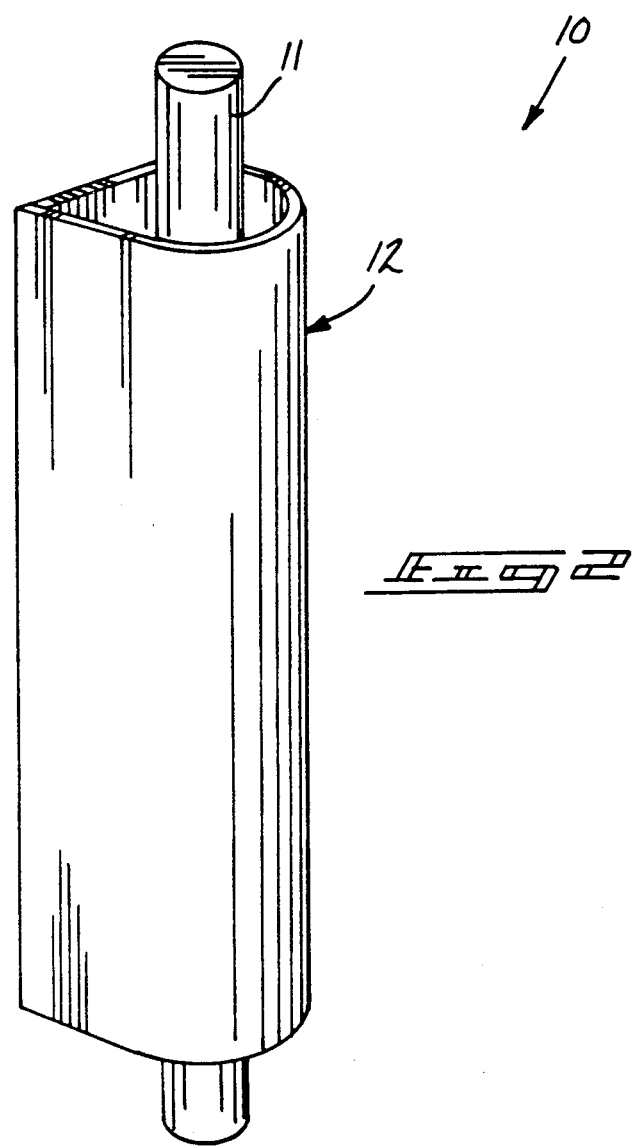

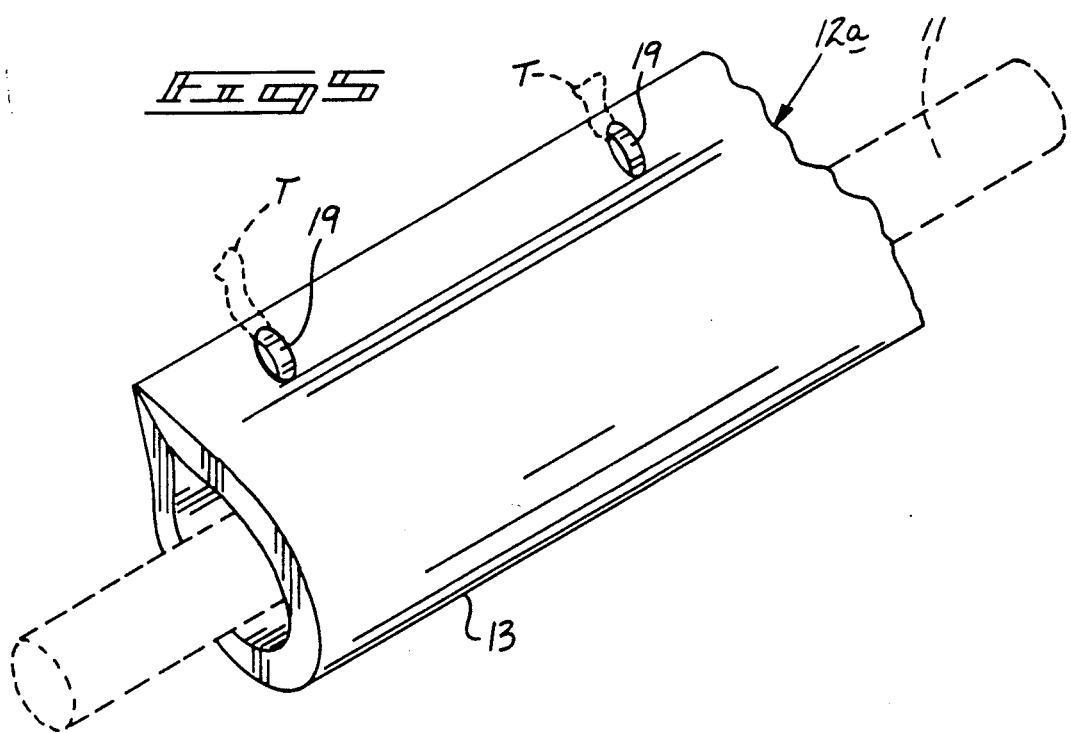
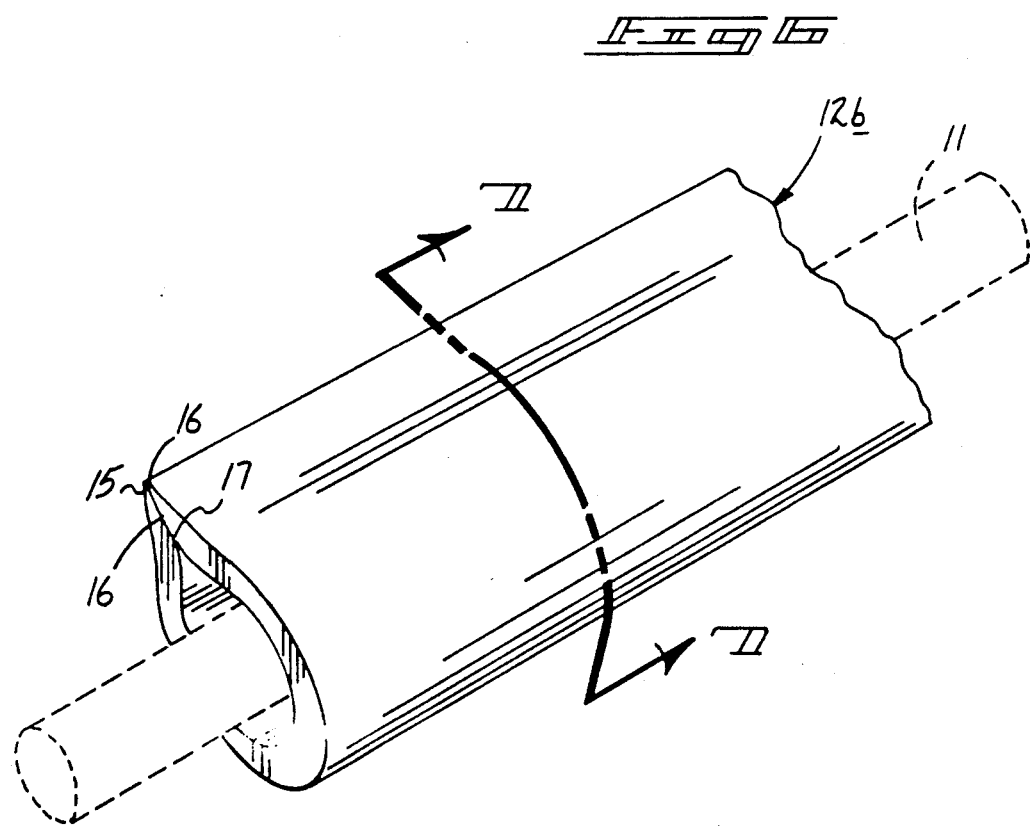

WIND DIRECTION

STREAMLINED GUIDE WIRE COVER APPARATUS

BACKGROUND OF THE INVENTION

1. Field of the Invention

The field of invention relates to streamlined covering organizations, and more particularly pertains to a new and improved streamlined guide wire cover apparatus mounted coextensively and rotatably about associated guide wires typically utilized in watercraft and aircraft applications providing a streamlined covering minimizing drag in the application of the associated water or aircraft.

2. Description of the Prior Art

Various covering organizations are available in the prior art, but the prior art has heretofore failed to provide a streamlined covering sheath for use with guide wire members to minimize friction and drag as the guide wire is directed through an airstream, such as a sail or other watercraft, as well as an aircraft application. Examples of the prior art include U.S. Pat. No. 4,461,793 to Blok illustrates the use of a covering for a wire, but the covering is of a heat shrinkable material to enclose an associated wire structure.

U.S. Pat. No. 4,763,541 to Spease includes a covering sheath for use in a motion-transmitting remote control assembly permitting snap-in securement of the assembly.

U.S. Pat. No. 4,753,123 to a cable device wherein the sheath is of an accordion-type construction to permit extension and retraction of the associated cable coextensively with the sheath.

U.S. Pat. No. 4,790,205 to Stocker sets forth a cable joint arrangement providing a flexible sheath covering fixedly mounted overlying an associated cable.

U.S. Pat. No. 4,391,767 to Pears sets forth the use of a polyester film coating.

As such, it may be appreciated that there continues to be a need for a new and improved streamlined guide wire cover apparatus wherein the same reduces drag with the cover apparatus coextensively mounted over an associated guide wire.

SUMMARY OF THE INVENTION

In view of the foregoing disadvantages inherent in the known types of wire covers now present in the prior art, the present invention provides a streamlined guide wire cover apparatus wherein the same permits a securement of a cover of a streamlined configuration coextensively overlying an associated guide wire. The cover includes a sheath formed of memory retentent material with opposed rear terminal ends, wherein the rear terminal ends are separable to permit acceptance of the guide wire therewithin and return to an initial enclosed position about the guide wire. As such, the general purpose of the present invention, which will be described subsequently in greater detail, is to provide a new and improved streamlined guide wire cover apparatus which has all the advantages of the prior art wire cover apparatus and none of the disadvantages.

To attain this, the present invention provides a guide wire cover including a parabolic arcuate forward end portion and including an upper and lower arcuate surface extending rearwardly into cooperating rear terminal ends terminating in a coextensive linear edge parallel to and arranged medially of the forward arcuate surface of the apparatus defining a sheath slidably mounted in cooperation with a guide wire and extending coextensively therewith. The sheath may further include a coextensive interior liner formed interiorly of the sheath mounted within a stepped floor of the sheath to define a coextensive interior arcuate surface to provide a surface resistant to premature erosion in cooperation with the associated guide wire.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved streamlined guide wire cover apparatus which has all the advantages of the prior art wire cover apparatus and none of the disadvantages.

It is another object of the present invention to provide a new and improved streamlined guide wire cover apparatus which may be easily and efficiently manufactured and marketed.

It is a further object of the present invention to provide a new and improved streamlined guide wire cover apparatus which is of a durable and reliable construction.

An even further object of the present invention is to provide a new and improved streamlined guide wire cover apparatus which is susceptible of a low cost of manufacture with regard to both materials and labor, and which accordingly is then susceptible of low prices of sale to the consuming public, thereby making such streamlined guide wire cover apparatus economically available to the buying public.

Still yet another object of the present invention is to provide a new and improved streamlined guide wire cover apparatus which provides in the apparatuses and methods of the prior art some of the advantages thereof, while simultaneously overcoming some of the disadvantages normally associated therewith.

Still another object of the present invention is to provide a new and improved streamlined guide wire cover apparatus wherein the same is positionable in a rotatable orientation overlying an associated guide wire minimizing drag as the guide wire is directed through an air stream.

A further object of the invention is to reduce guide wire wake turbulence thereby improving performance of down wind aerodynamic surfaces such as sails.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a prior art wire cover apparatus.

FIG. 2 is an isometric illustration of the instant invention.

FIG. 5 is an isometric illustration of a further modified guide wire cover apparatus.

FIG. 6 is an isometric illustration of a yet further modified guide wire cover apparatus.

DESCRIPTION OF THE PREFERRED EMBODIMENT

Figure 3:
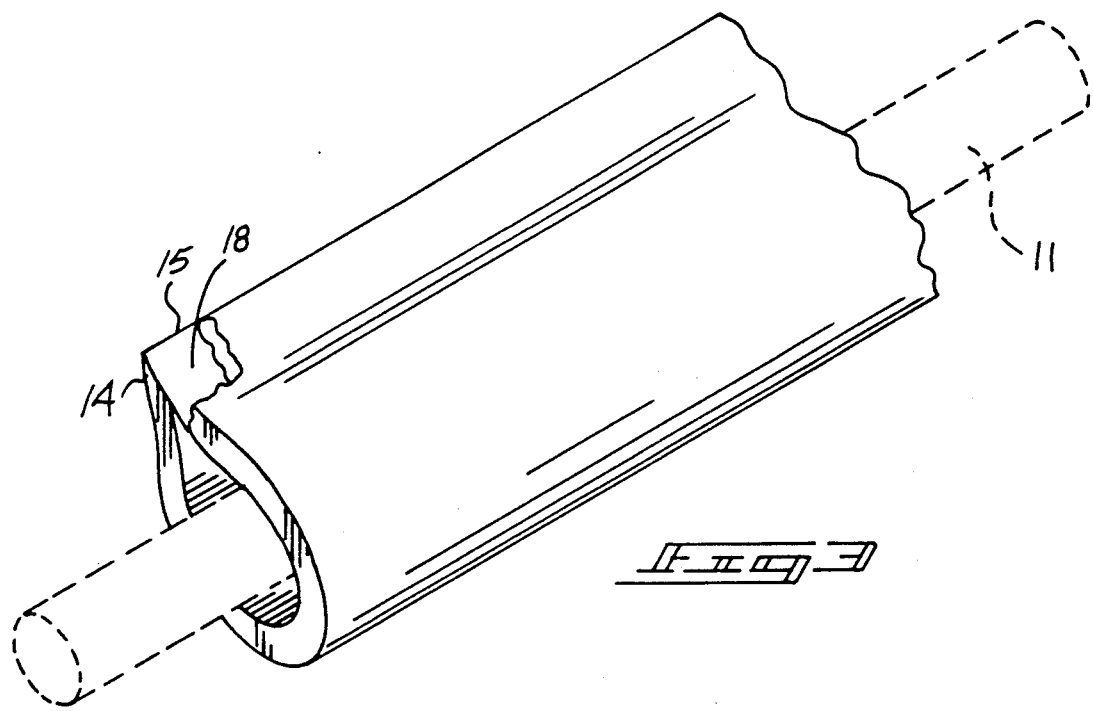
FIG. 3 is an isometric illustration of the instant invention, partially in section, illustrating an interior surface configuration of the rear terminal ends of the covering sheath.
Figure 4:
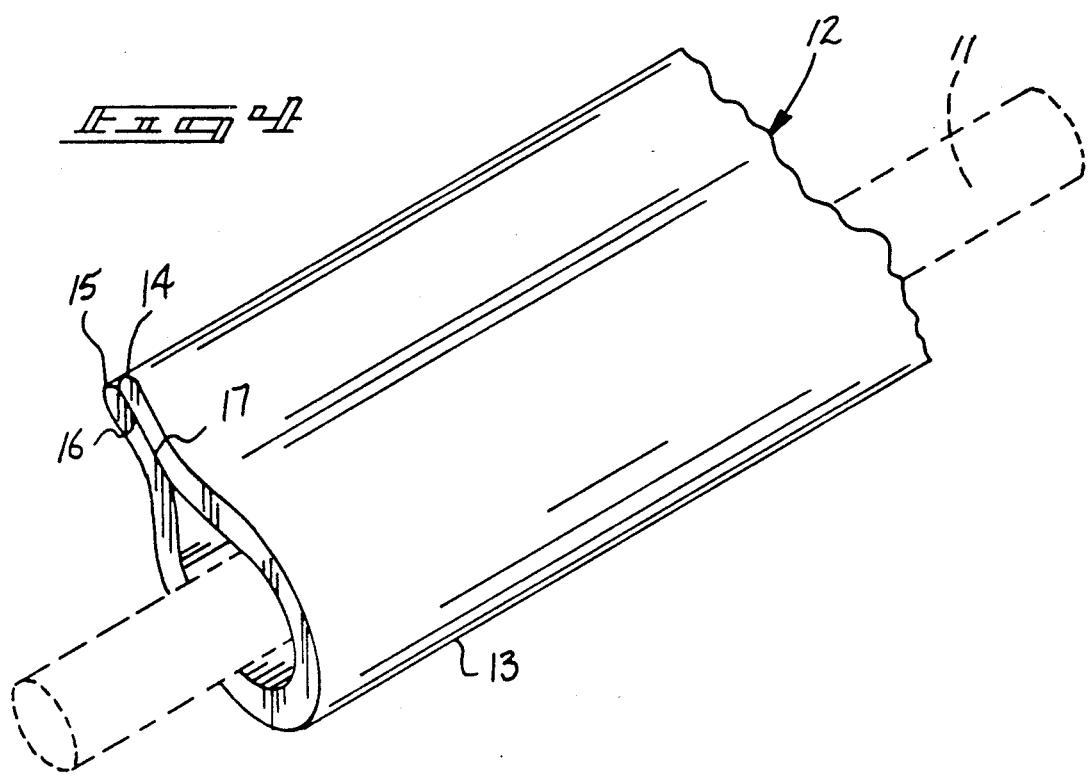
FIG. 4 is a further isometric illustration of the instant invention illustrating a modified rear terminal end surface structure.

With reference now to the drawings, and in particular to FIGS. 1 to 8 thereof, a new and improved streamlined guide wire cover apparatus embodying the principles and concepts of the present invention and generally designated by the reference numeral 10 will be described.

FIG. 1 illustrates a prior art wire cover apparatus 1 wherein an elongate wire 2 includes a heat shrinkable tubing 3 positionable thereover, wherein a transitory configuration of the heat shrinkable tubing 3 is illustrated in an initial loosely fit configuration about the associated wire 2 prior to its shrinking about the wire.

Figure 8:
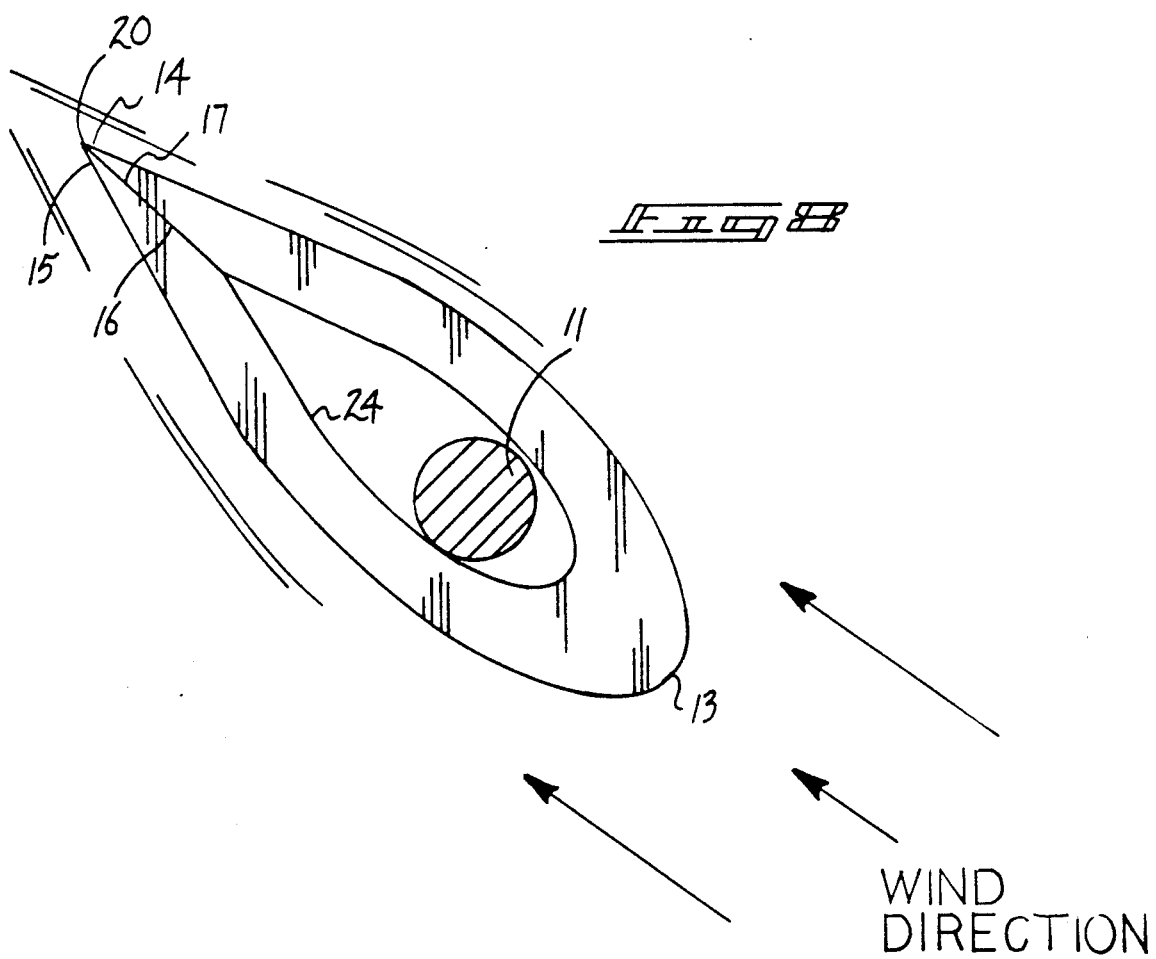
FIG. 8 is an orthographic cross-sectional view of the guide wire cover apparatus of the instant invention in association with an airstream.

More specifically, the streamlined guide wire cover apparatus 10 of the instant invention essentially comprises a sheath 12 coextensively, rotatably, slidably mounted about an associated elongate guide wire 11. The guide wire 11 is of a type typically utilized in aircraft and watercraft construction. The sheath 12 is arranged to minimize and reduce wind drag as the associated guide wire 11 and sheath 12 are directed through an air stream, as illustrated in FIG. 8 for example.

The sheath 12 is formed with an arcuate forward surface 13 coextensive with the sheath 12, wherein the sheath 12 is defined by a cross-sectional configuration of a generally parabolic configuration forwardly thereof, wherein the sheath extends rearwardly defining a curvilinear top surface 21 overlying a curvilinear bottom surface 22 (see FIG. 7 for example) that extend rearwardly terminating in a first and second respective rear terminal end 14 and 15. The first and second rear terminal ends merge into a single elongate edge 20. The edge 20 is arranged generally parallel to the arcuate forward surface 13 coextensively therewith and arranged medially of the surface 13 bisecting the longitudinal axis of the cross-sectional configuration of the sheath 12. The first and second rear terminal ends include terminal end portions of respective first and second confronting surfaces 16 and 17 arranged in confronting relationship relative to one another. FIG. 3 illustrates the use of an adhesive 18 formed between the first and second surfaces to permit permanent securement of the surfaces together once positioned about the associated guide wire 11. Initially, the first and second terminal ends 14 and 15, along with the confronting surface 16 and 17, are separable relative to one another to permit expansion and accommodation of the guide wire 11 therethrough, whereupon subsequently the first and second confronting surfaces 16 and 17 return to an original configuration due to the memory retentent polymeric construction utilized throughout the formation of the sheath 12. Further, the use of through-extending apertures 19 are directed in a modified sheath 12a through the first and second confronting surfaces 16 and 17 respectively to receive the use of flexible "tell-tales" therethrough to further permit visual observation of wind direction in use in a nautical environment. Such "tell-tale" members "T", as illustrated in FIG. 5, are frequently utilized in sail boat construction to provide further visual observation of wind direction during maneuvering of the associated sail boat.

Figure 7:
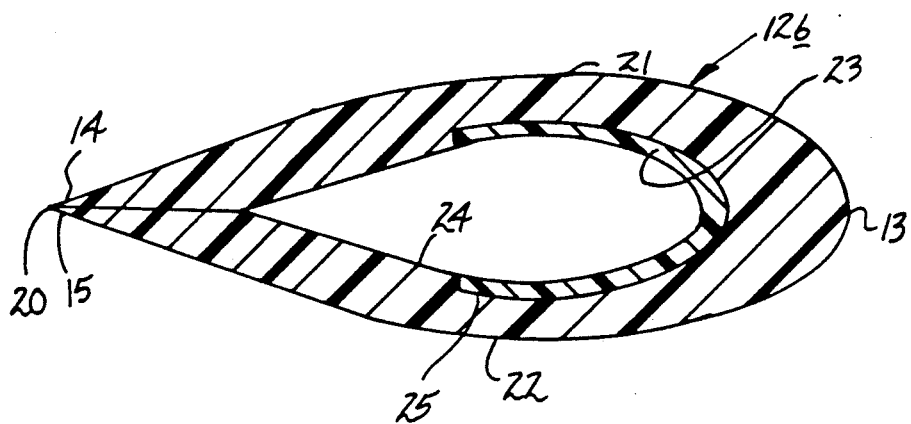
FIG. 7 is an orthographic view, taken along the lines 7—7 of FIG. 6, in the direction indicated by the arrows.

FIG. 7 illustrates the use of a further modified sheath construction 12b, wherein the interior tear-drop cavity of the sheath 12b is defined by a single interior surface 24, wherein a coextensive "Teflon TM" liner is integrally mounted coextensively to an interior surface of the interior surface 24 forwardly thereof defining two-thirds of the interior surface. This "Teflon" liner 23 minimizes erosion of the interior surface 24 during co-operation of the sheath 12b with the guide wire 11. The liner 23 is mounted within a stepped recess 25 formed about a forward portion of the interior surface 24, wherein the stepped recess is defined by a height substantially equal to a predetermined thickness of the liner 23 to provide a single linear coextensive interior surface 24 minimizing frictional engagement of the interior surface with an associated guide wire 11 during use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A streamlined guide wire cover apparatus comprising, an elongate sheath of a generally parabolic cross-sectional configuration in combination with an elongate wire, the sheath includes a forward arcuate surface extending rearwardly to a top arcuate surface overlying and coextensive with a bottom arcuate surface defining a cavity therewithin rotatably and slidably mounted about and receiving the wire, and the top arcuate surface extending rearwardly of the forward arcuate surface to a first rear terminal edge, and the bottom arcuate surface extending rearwardly of the forward arcuate surface to a second rear terminal edge, the first and second rear terminal edges are normally biased towards one another in a first contiguously arranged position relative to the first and second rear terminal edges and are separable to a second position to permit reception of the wire within the cavity between the first and second rear terminal edges, and wherein the first and second rear terminal edges are coextensive with the forward surface and are arranged generally parallel thereto and define a single coextensive rear edge, the rear edge bisects a longitudinal axis of the cavity defined by the sheath, and wherein the sheath is coextensive with the elongate wire, and wherein the first and second rear terminal edges and the cavity define opposed top and bottom surfaces, the top surface overlying the bottom surface, and wherein the top and bottom surfaces include an adhesive therebetween to fixedly secure the top and bottom surface together when the wire is positioned within the cavity, and including a plurality of apertures directed through the top and bottom surfaces, and a flexible indicator marker mounted within each aperture to provide visual indication of wind direction, and wherein the cavity is defined by a coextensive interior surface, the interior surface includes a stepped recess formed within the interior surface about a major portion thereof extending in a spaced relationship relative to the top and bottom surface of the first and second rear terminal edges, and a rigid liner defined by a predetermined thickness substantially equal to a predetermined height of the stepped recess fixedly mounted within the recess, the rigid liner formed of a predetermined material to resist erosion of the interior surface.

2. An apparatus as set forth in claim 1 wherein the liner is formed of "Teflon".

* * * * *